United States Patent
Gretz

(10) Patent No.: US 8,933,331 B1
(45) Date of Patent: Jan. 13, 2015

(54) REVERSIBLE ELECTRICAL BOX ASSEMBLY WITH EXTENSIONS TO MATCH VARIOUS REVEALS

(71) Applicant: Thomas J. Gretz, Port St. Lucie, FL (US)

(72) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 150 days.

(21) Appl. No.: 13/681,127

(22) Filed: Nov. 19, 2012

(51) Int. Cl.
*H02G 3/08* (2006.01)
*H02G 3/10* (2006.01)
*E04B 2/00* (2006.01)
*H02G 1/00* (2006.01)

(52) U.S. Cl.
CPC .. *H02G 3/10* (2013.01); *E04B 2/00* (2013.01); *H02G 1/00* (2013.01); *Y10S 248/906* (2013.01)
USPC .................. 174/50; 174/53; 174/58; 220/3.2; 220/3.3; 248/906

(58) Field of Classification Search
CPC ......... H02G 3/081; H02G 3/08; H02G 3/088; H02G 3/10; H02G 3/12; H02G 3/123; H02G 3/14; H01H 9/02; H01H 9/04; H05K 5/00
USPC ............... 174/480, 481, 50, 53, 57, 17 R, 58; 220/3.2–3.9, 4.02; 248/906
See application file for complete search history.

(56) References Cited

U.S. PATENT DOCUMENTS

| | | | | | |
|---|---|---|---|---|---|
| 4,927,039 | A | * | 5/1990 | McNab | 174/57 |
| 5,402,902 | A | * | 4/1995 | Bouley | 220/3.2 |
| 5,728,973 | A | * | 3/1998 | Jorgensen | 174/666 |
| 5,740,936 | A | * | 4/1998 | Nash | 220/3.3 |
| 6,649,835 | B2 | * | 11/2003 | Gilleran | 174/58 |
| 7,176,377 | B1 | * | 2/2007 | Gretz | 174/58 |
| 7,637,385 | B2 | * | 12/2009 | Wegner et al. | 174/57 |
| 7,674,974 | B1 | * | 3/2010 | Shotey et al. | 174/53 |
| 8,084,687 | B1 | * | 12/2011 | Thurman | 174/50 |
| 8,729,388 | B2 | * | 5/2014 | Korcz et al. | 174/50 |
| 8,748,744 | B2 | * | 6/2014 | O'Connor et al. | 174/53 |

* cited by examiner

*Primary Examiner* — Angel R Estrada

(57) ABSTRACT

A reversible electrical box for securing electrical fixtures or devices on the exterior wall of a building. The electrical box has an interchangeable rear element and an extension spacer which allow the achievement of a desired reveal depending on the wall finish thickness. It can be installed on unfinished walls upon which a finishing, such as stucco, is then applied or it can be installed as a retrofit on an existing finished wall. Two principal embodiments are shown with the first embodiment serving to attach electrical devices and the second embodiment serving to attach electrical fixtures.

19 Claims, 8 Drawing Sheets

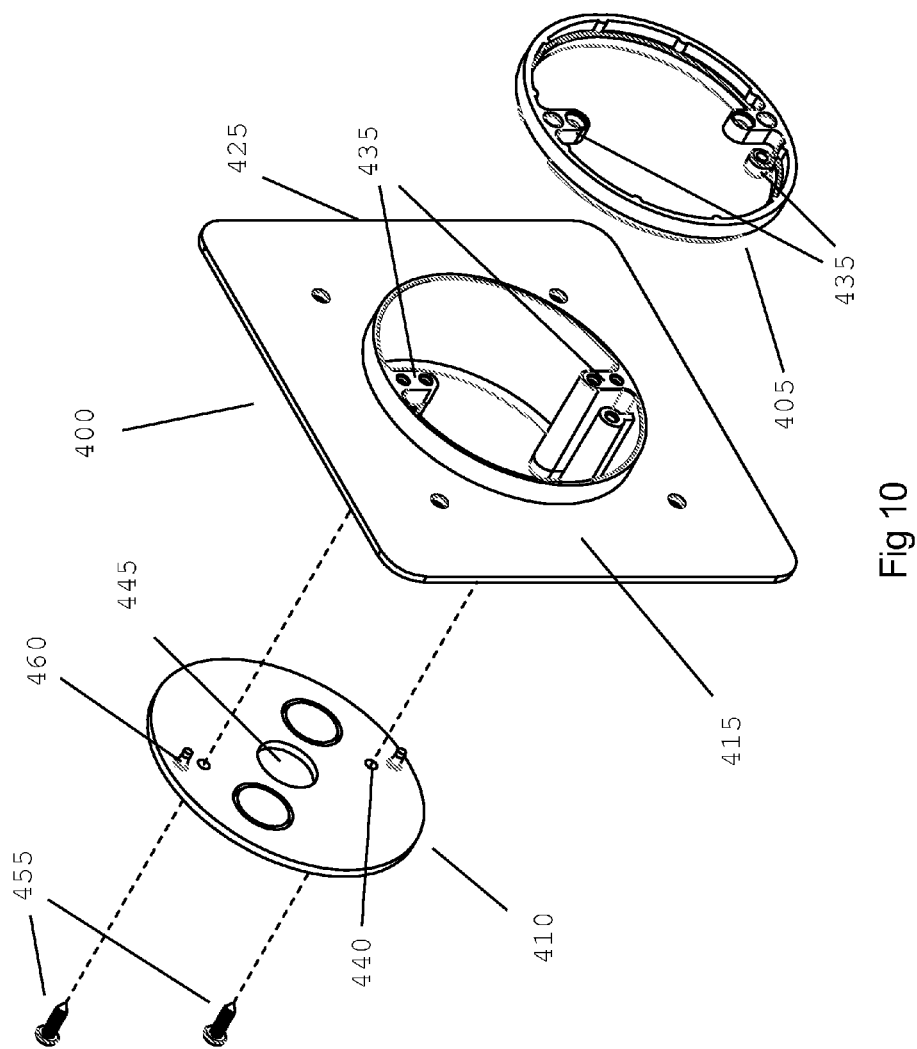

US 8,933,331 B1

REVERSIBLE ELECTRICAL BOX ASSEMBLY WITH EXTENSIONS TO MATCH VARIOUS REVEALS

FIELD OF THE INVENTION

The present invention relates to assemblies for the mounting of electrical devices and fixtures, and, more specifically, to electrical box assemblies which are typically installed and utilized in the exterior walls of buildings and other structures.

BACKGROUND OF THE INVENTION

A common goal in installing electrical boxes for devices and fixtures in exterior walls, particularly those having a stucco finish, is to install the face of the box substantially flush with the exterior wall surface.

Stucco is frequently applied to exterior walls in order to create a decorative but durable coating. The depth of the stucco application is typically defined by an architectural stucco reveal system. The stucco reveal system typically includes interconnecting strips of material, or reveals, which are attached to an underlying substrate. The reveals provide a screed edge which will define the location of the face surface of the stucco and thus the depth of the stucco. The reveals are usually provided in several standard sizes in order to form a desired stucco depth. Typically, stucco applications are completed in one of three particular thicknesses, i.e., 1⅜", ⅞", and ⅝".

As a result of the various conventional depths of stucco applications on exterior walls, several sizes of electrical boxes are required at the job site in order to insure that the electrical box is flush with the wall finish. It is therefore desirable to have a single electrical box assembly that can be configured at the job site to match the installed reveal and thereby mount the electrical box flush with the stucco surface.

OBJECT OF THE INVENTION

It is a goal of the invention to provide a reversible recessed device or fixture box to be used in exterior walls that sits essentially flush with the finished coating on such walls.

It is a further goal of the invention to provide a reversible box with interchangeable parts so as to permit the box to be used in exterior walls having varying finish thicknesses. More specifically, it is an object of the invention to provide an electrical box assembly which facilitates the mounting of electrical devices and fixtures in any of three different finish thicknesses.

It is another goal to provide a reversible box which does not require the installation or use of additional gaskets or caulking in order to prevent water or air intrusion.

It is a further goal to minimize the cost of the box assembly by constructing it of a minimal number of parts.

SUMMARY OF THE INVENTION

The present invention describes an electrical box for securing electrical fixtures or devices on the exterior wall of a building. The electrical box includes a reversible body member, a rear enclosure, and an extension spacer which allow it to work with a variety of exterior wall finish thicknesses. The reversible box unit is body member defined by an opening therethrough, a flange about the periphery, and sidewalls extending from each side of the opening. The flange divides the box unit into a first side, having shorter wall projections, and a second side, having longer wall projections. The rear enclosure may be mounted on either side of the box unit. Further, an extension spacer is provided which may be attached to further extend the wall projections of either side of the reversible box unit. These features permit the box to be installed substantially flush with an exterior wall surface having a ⅝", ⅞", or 1⅜" finished surface. Two principal embodiments are shown with the first embodiment serving to attach electrical devices and the second embodiment serving to attach electrical fixtures.

DESCRIPTION OF THE DRAWINGS

FIG. 10 is an exploded perspective view of the second side of a second embodiment of the reversible recessed device box assembly disclosed herein.

TABLE OF NOMENCLATURE AND PARTS

Figure 1:
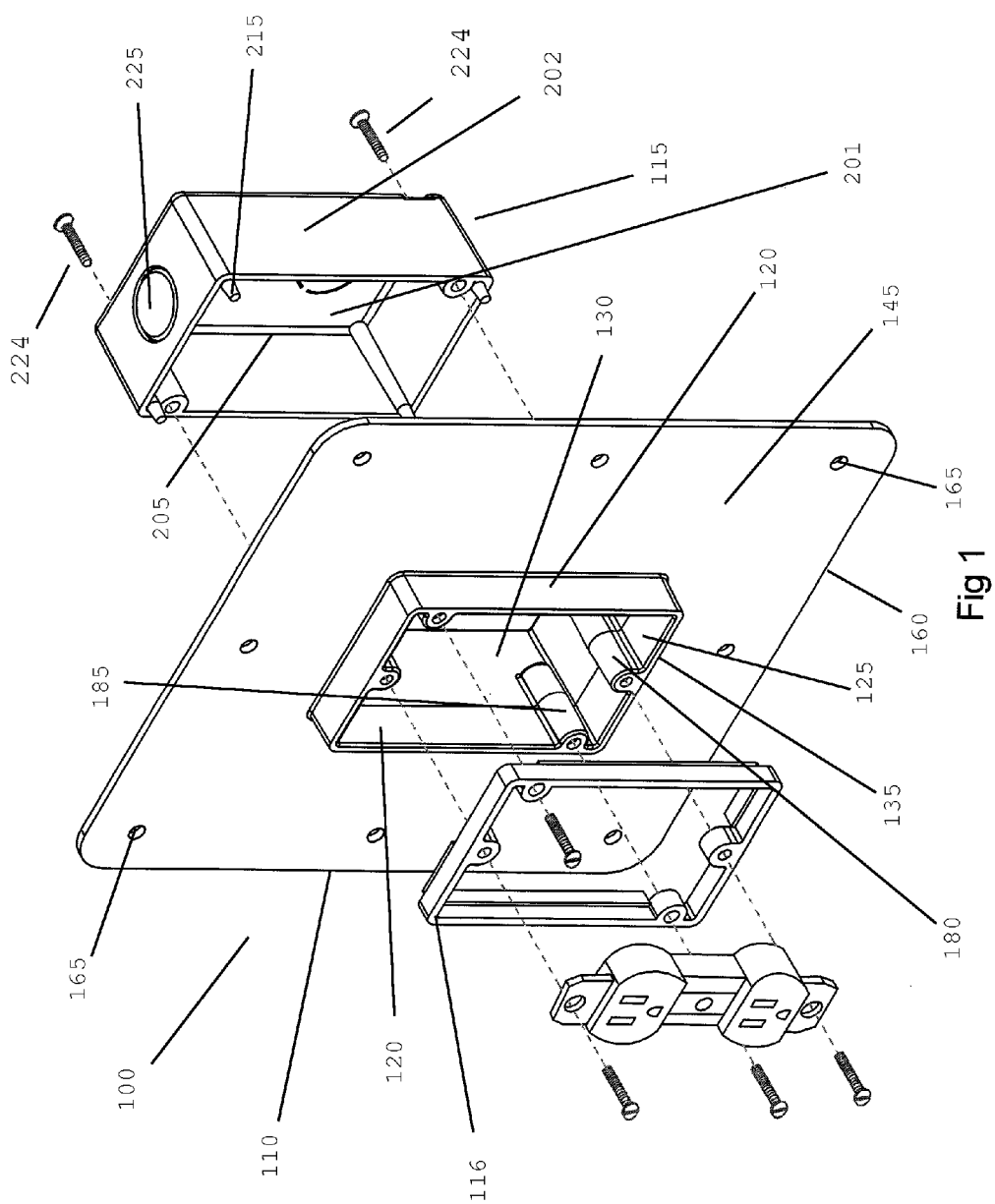
FIG. 1 is an exploded perspective view of a first embodiment of the reversible recessed device box assembly disclosed herein.

The following is a listing of the nomenclature and parts, along with accompanying reference numerals, that are used to describe the invention set forth herein:

Part Number Brief Description

100 Electrical outlet box assembly
110 Body
115 Rear enclosure box member
116 Spacer
120 Body sidewall (short)
125 Body sidewall (long)
130 Interior space of body
145 Flange
150 First-side of flange
155 Second-side of flange
160 Flange edge
165 Flange aperture
170 First End
175 Second End
180 Component boss
185 Sidewall boss
186 Bore
190 Bore
195 Bore
200 Front opening of box member
201 Rear wall of box member 202 Peripheral wall of box member
205 Interior space of box member
210 Aperture
215 Stabilizing post
220 Alignment tab
224 Fastener
225 Knockout portions
235 Front-side of extension spacer
240 Rear-side of extension spacer
245 Spacer sidewall boss
250 Space component boss
255 Spacer flange

DETAILED DESCRIPTION

FIG. 1 illustrates a first embodiment of the electrical box assembly 100 disclosed herein. Device box assembly 100 includes a body 110, a rear enclosure box member 115, and a spacer 116. The body comprises sidewalls 120, 125 having an interior surface and, further, both ending in a planar face and defining an interior space 130. The body 110 further includes a flange 145 which extends outward from the sidewalls 120, 125. The flange 145 thereby divides the body into two portions.

Figures 2, 3:
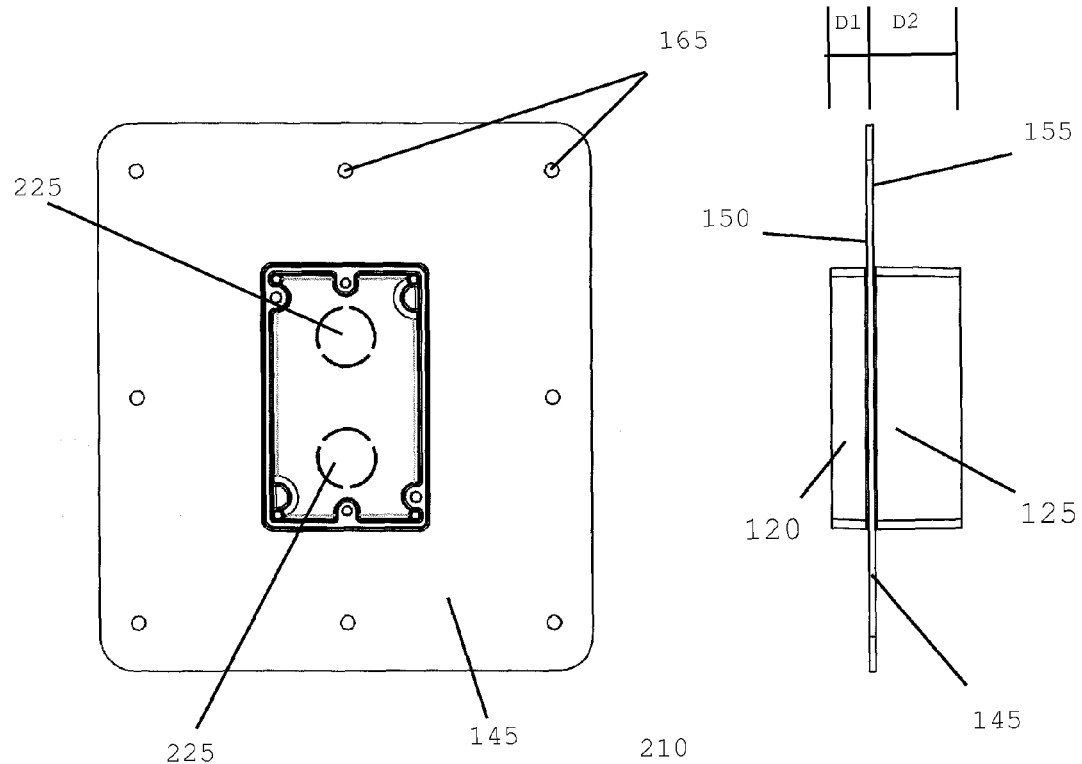
FIG. 2 is a front view of a first embodiment of the reversible recessed device box assembly disclosed herein.
FIG. 3 is a side view of a first embodiment of the reversible recessed device box assembly disclosed herein.

The flange 145 has a first side 150 and a second side 155 as shown in FIG. 3. The flange terminates in an edge 160. In a preferred embodiment, each respective edge 160 is the same distance from the respective sidewall 120,125 from which that portion of the flange 145 originates and, therefore, the flange 145 is essentially square in shape. The flange 145 further includes at least one aperture 165. As seen in FIG. 2, the preferred embodiment would include four such apertures 165. The flange 145 possesses a flat surface so as to assist in assuring a moisture-resistant seal between the flange and a mounting substrate.

Figure 4:
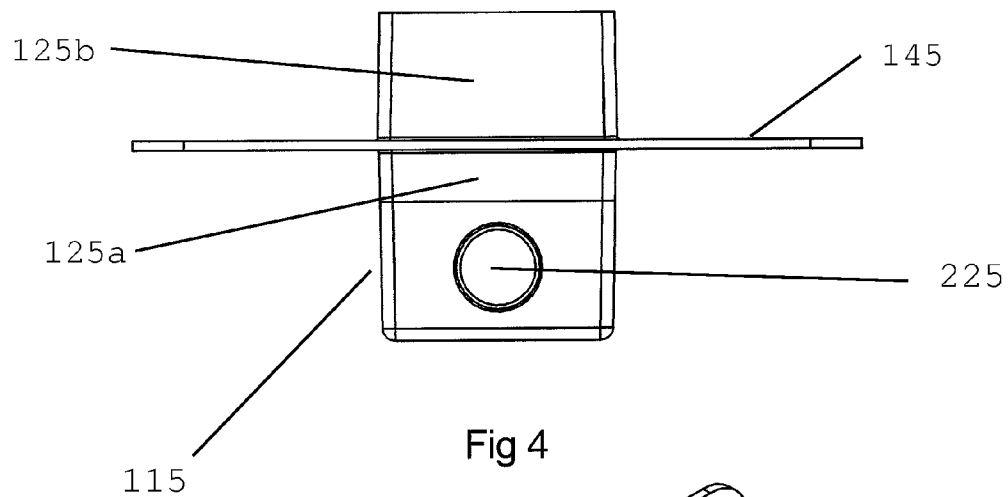
FIG. 4 is a side view of a first embodiment of the reversible recessed device box assembly disclosed herein.

Referring now to FIG. 3, with regard to the orthogonal sidewalls 120,125, the body 110 includes a first (short) sidewall 120 extending from the first side of the flange 150 at a first distance $D_1$ and terminating in a planar first end 170. The body 110 further includes a second (long) sidewall 125 extending from the second side of the flange 155 at a distance of $D_2$ and terminating in a planar second end 175. $D_1$ and $D_2$ are not identical values and, accordingly, the short sidewall 120 on the first side 150 and the long sidewall 125 on the second side 155 extend from the flange 145 by varying amounts as illustrated in FIG. 4. It will also be noted that the first embodiment may include first and second sidewalls that are essentially circular in shape rather than orthogonal.

Figure 5:
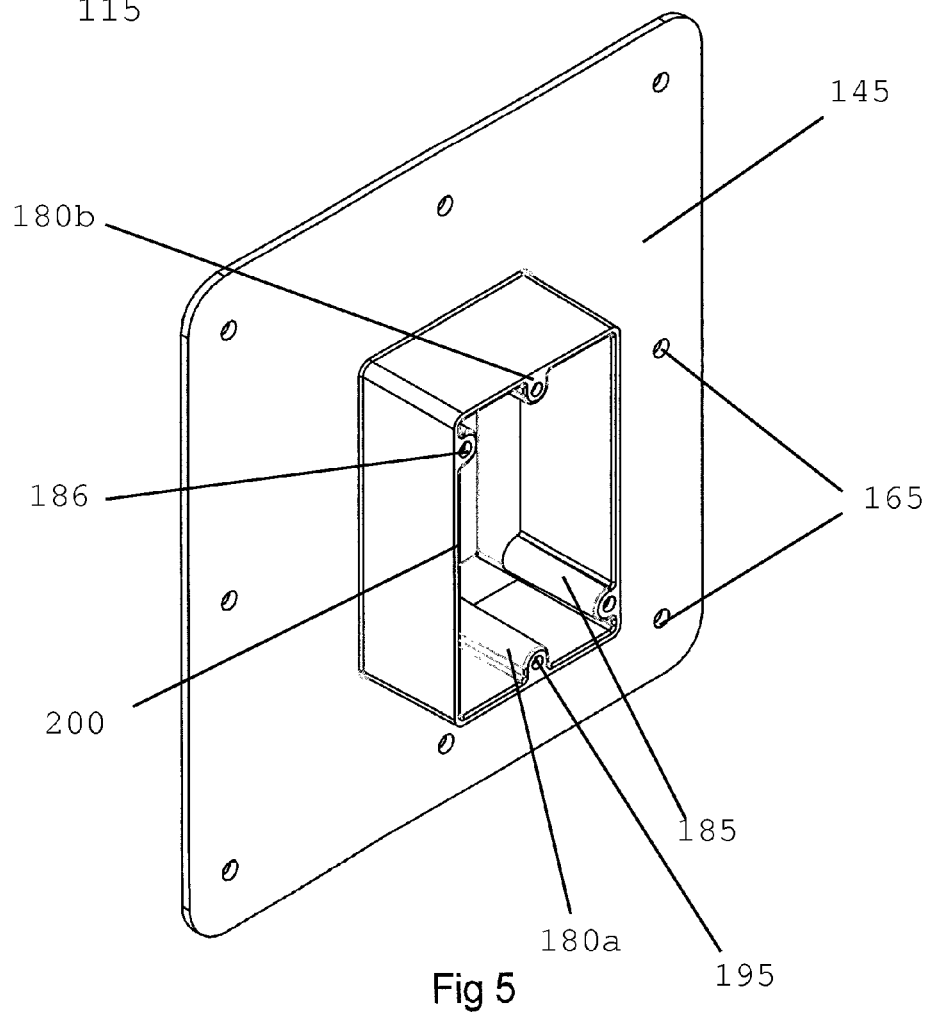
FIG. 5 is a perspective view of a first embodiment of the reversible recessed device box assembly disclosed herein.

The body 110 includes at least one component boss 180 integral with and projecting from the interior surface of the body 110, as seen in FIG. 5. In the preferred embodiment, the body 110 includes two component bosses 180a, 180b. Each component boss 180 generally runs the length of the sidewalls 120, 125 from the first end 170 to the second end 175. Each component boss 180 further includes a first bore 190 on the side of the first opening and a second bore 195 on the side of the second opening; said bores may be combined into a single bore extending the length of the component boss, or, preferably, each component boss 180 includes two separate bores 190, 195, each on opposite sides of each respective component boss 180 and extending along a portion of the component boss 180 at a location co-axial to the bore on the opposite side of the particular component boss. This allows each component boss to receive a fastener from either side of the body 110.

As further illustrated in FIG. 5, the body 110 further includes at least one sidewall boss 185 also integral with and projecting from the interior surface of the body 110. The preferred embodiment would include two sidewall bosses 185a, 185b on the first side 150 and two sidewall bosses 185c, 185d on the second side 155. Further, in this embodiment, the bosses on the first side 185a, 185b are positioned on opposing sidewalls essentially diagonal from one another. The bosses on the second side 185c, 185d are positioned in a similar fashion on the opposite side of the flange; however, the bosses found on the first side 150 are positioned in a minor-image fashion to those of the second side 155. Each sidewall boss also includes a bore 186 which, in the case of bosses 185a and 185b, opens to the first side and, in the case of bosses 185b and 185c, opens to the second side, each said bore 186 disposed to receive a fastener.

Figure 6:
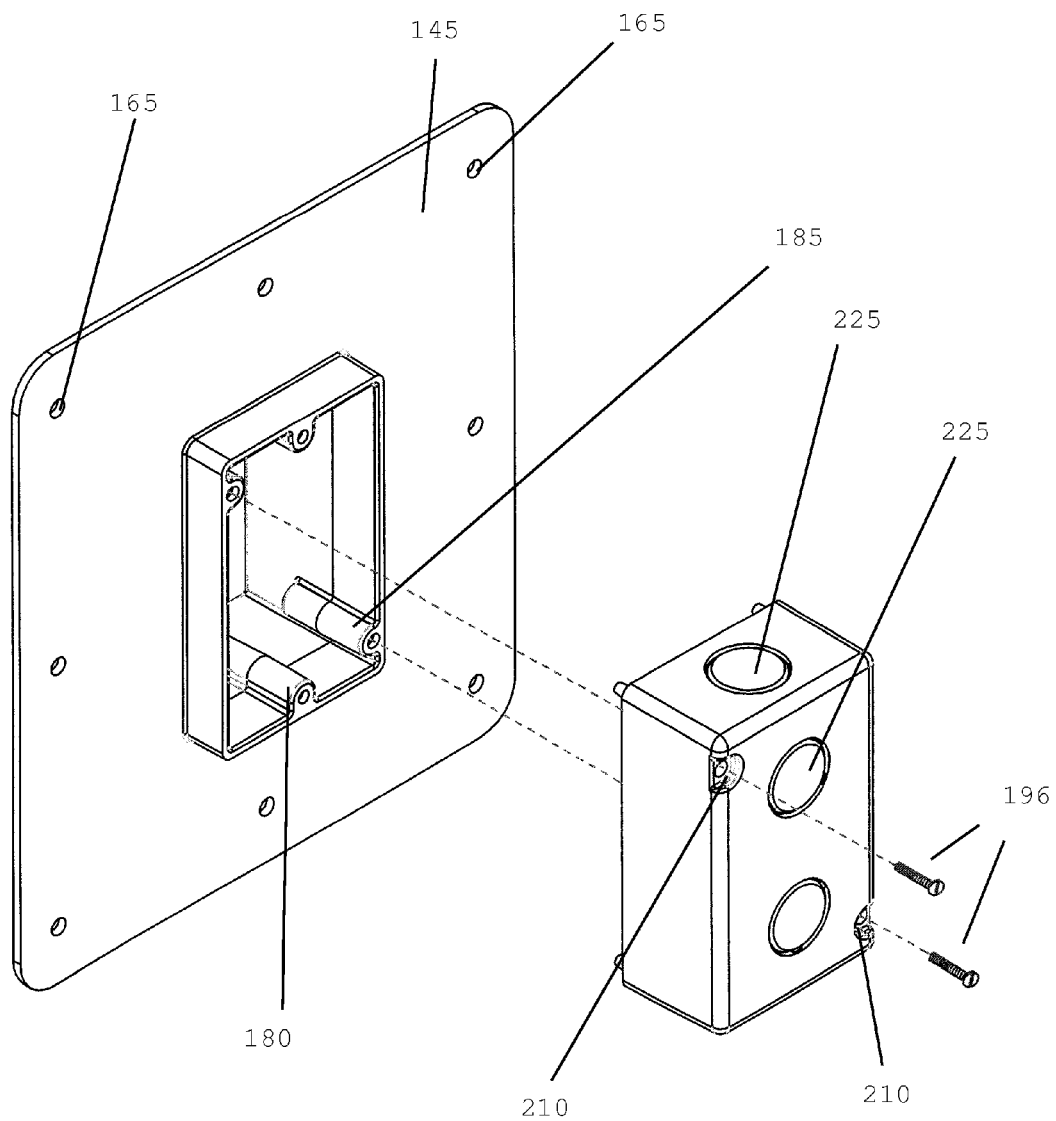
FIG. 6 is an exploded perspective rear view of a first embodiment of the reversible recessed device box assembly disclosed herein.

Referring now to FIG. 6, a rear enclosure box member 115 is provided for closing either end of the body 110. The rear enclosure box member 115 has a back wall 201, peripheral walls 202 extending orthogonally from the back wall 201 and a front opening 200 defining an interior space 205 therein. The box member 115 further includes at least one aperture 210, at least one stabilizing post 215, and at least one alignment tab 220. The peripheral walls 202 may be so shaped as to facilitate the insertion of a fastener 224 into and through the apertures 210 in a direction originating from the back wall 201 such that the fastener passes only through the aperture 210 and, further, does not extend beyond the periphery defined by the back wall 201 and peripheral walls 202. In such an embodiment, at least a portion of the peripheral wall 202 may project into the interior space 205 thereby creating a channel for the fastener 224 on the exterior of the box member. The back wall 201 and/or peripheral walls 202 include one or more removable wall portions or knockouts 225. The rear enclosure box member 115 may be installed on either side of the body 110 and used to close either the front opening or rear opening of the body 110.

Figure 7:
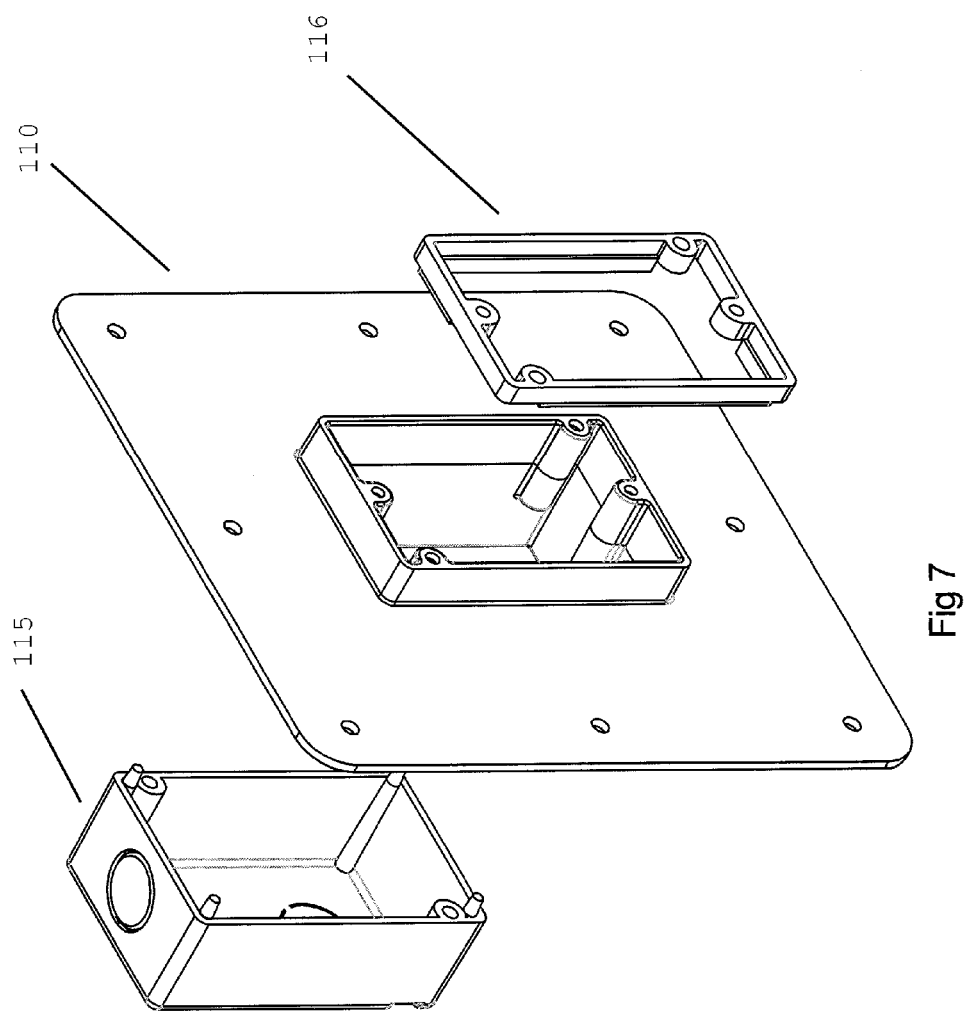
FIG. 7 is an exploded perspective rear view of a first embodiment of the reversible recessed device box assembly disclosed herein.
Figure 8:
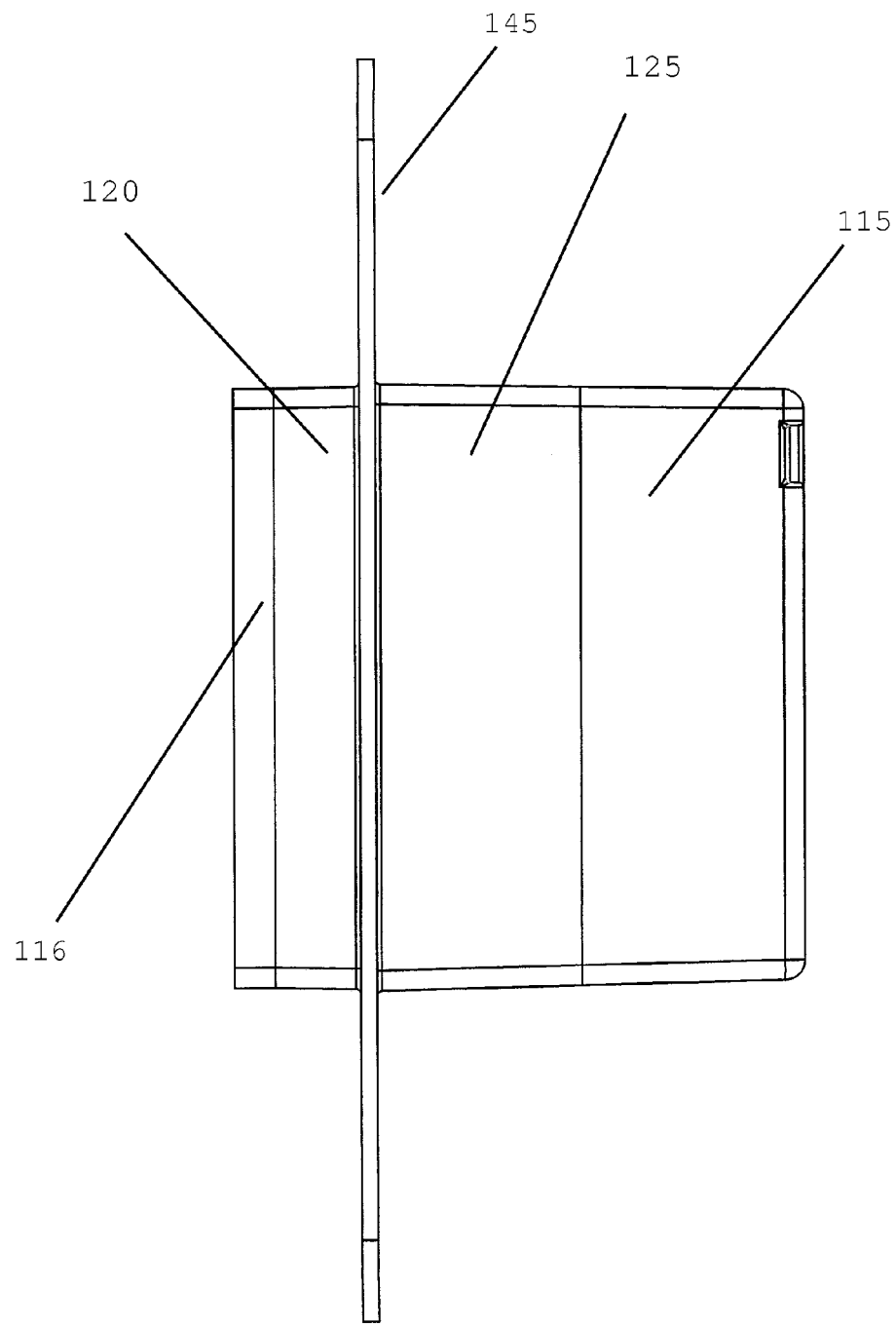
FIG. 8 is a side view of a first embodiment of the reversible recessed device box assembly disclosed herein.

An optional extension spacer 116, best seen in FIGS. 7 and 8, may also be utilized in the box assembly 100. The extension spacer 116 is adapted for use with the box assembly 100 and is of corresponding shape and size. The extension spacer 116 having a front side 235 and a rear side 240, and, further, having at least one sidewall spacer boss 245 integral with the construction of the extension spacer and possessing an aperture therein, at least one component spacer boss 250 integral with the construction of the extension spacer and possessing an aperture therein, and an orthogonal peripheral flange 255 which circumscribes at least a portion of the rear side 240 of the spacer 116. The flange 255 does not extend along the portion of the spacer from which the bosses 245, 250 originate. In the preferred embodiment, the spacer includes two component spacer bosses 250 and two sidewall spacer bosses 245. When installed on the box assembly, the apertures or bores of the component spacer bosses 250 are axially aligned with the bores of the component bosses 180 in the body 110. Further, in such cases, the apertures or bores of the sidewall bosses 245 are axially aligned with the bores of the sidewall bosses 185 in the body 110. Alignment of the bores allows a user to insert one or more fasteners through the spacer 116 and into the body 110.

Figure 9:
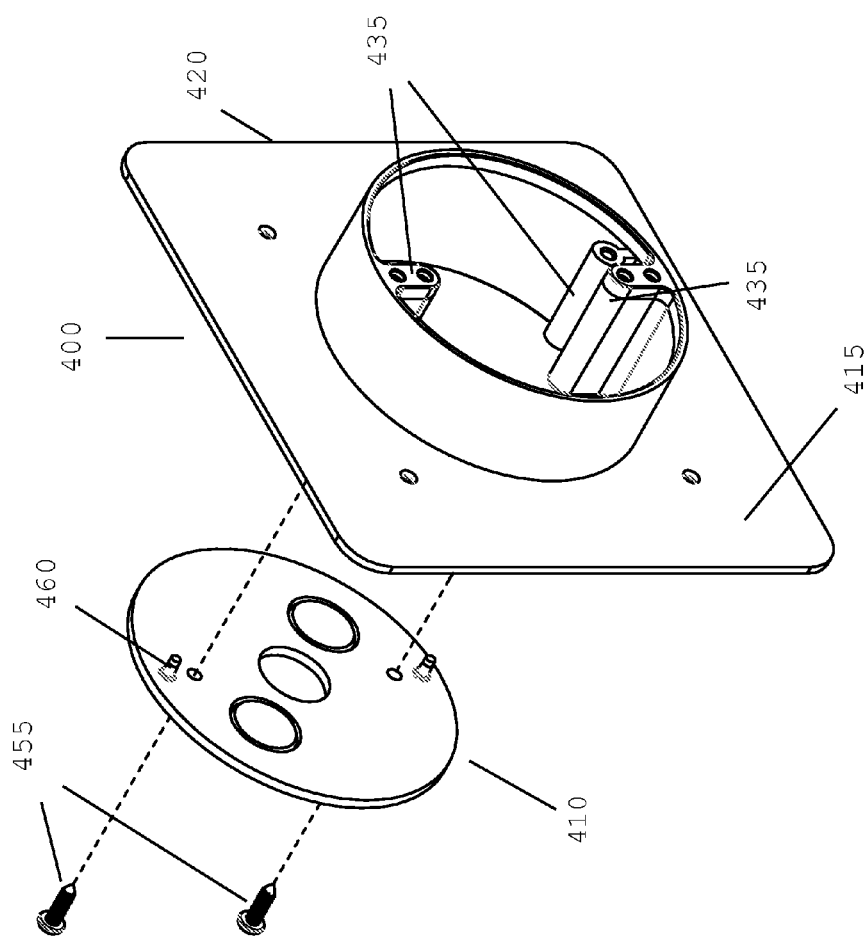
FIG. 9 is an exploded perspective view of a second embodiment of the reversible recessed device box assembly disclosed herein.

A second embodiment of the invention is specifically adapted for use with electrical fixtures in that the sidewalls are circular in nature. Referring now to FIGS. 9 and 10, the second embodiment comprises a body member 400, extension spacer 405 and a rear enclosure 410. The body member 400 is cylindrical in shape and defines an interior cylindrical space. The body member 400 includes a flange 415 which extends outwards from the body member 400. The flange 415 has a first side 420 and a second side 425. The flange 415 divides the exterior of the body and is so positioned such that the distance $D_3$ that the hollow body extends beyond the first side 420 is a different value than the distance $D_4$ the hollow body extends beyond the second side 425. The second embodiment further includes a rear enclosure plate 410 which is disposed to be mounted on either the first side 420 or second side 425 of the body member 400. The assembly includes various bosses 435, apertures 440, and knockouts 445 to allow for the installation and use of this embodiment in a fashion substantially identical to the first embodiment disclosed supra. The rear enclosure plate 410 includes at least one aperture 440 capable of receiving a fastener 455 and two mounting posts 460. In this embodiment, the rear enclosure plate is essentially a flat plate or disk 410.

Operation and Use

The electrical box assembly 100 disclosed herein simplifies the installation of devices and fixtures on a variety of finished exteriors, although the box is preferably designed to be used on walls incorporating a stucco finish or cladding. It may be used on an unfinished wall or as a retrofit on an existing finished wall. The electrical box assembly 100 offers the ability to interchange the location of the rear enclosure box member 115 and, further, to optionally incorporate an extension spacer 116, which is included with the product to provide for installation with three different finish thicknesses.

In operation, a user first determines the desired reveal. The electrical box assembly 100 may be distributed pre-assembled in any of the three thickness configurations. In a preferred embodiment, the electrical box assembly is pre-assembled to be used with 1⅜" wall finish thicknesses. That is, in this 1⅜" configuration, the box member 115 is removably secured via fasteners to the short sidewalls extending from the first side of the flange. This configuration provides a 1⅜" reveal.

Alternatively, if the box is to be used with a wall finish thickness of ⅝", a simple conversion may be effected. In this case, the rear enclosure box member 115 is disconnected from the body 110 (assuming that it was initially connected). The box member 115 is then installed on the second side 155 of the flange via an attachment to the long sidewall 125. In essence, the body 110 is reversed such that the opposite side of the body 110 now bears the box member and is inserted into the opening in the wall or substrate. Accordingly, this arrangement achieves a ⅝" reveal.

If the box is to be used in an application having a ⅞" wall finish, the extension spacer 116 would be installed on the first side of the flange 145 as seen in FIG. 1. The spacer 116 is mounted such that the rear portion 240 of the spacer 116 abuts the body 110. The additional width of the spacer 116 further increases the volume of the interior space 130. The peripheral flange 255 is positioned such that it extends into the interior space and serves to further secure the spacer 116 in position. Once the extension spacer 116 has been attached, the assembly is ready to be used in an application to achieve a ⅞" reveal.

Once the cladding thickness is determined and the box assembly 100 is configured for such thickness, the box member 115 is then inserted into an appropriately sized hole cut within the substrate upon which the assembly 100 is to be mounted. The rear enclosure box member 115 is therefore recessed behind the substrate. The opposing side of the flange is exposed on the exterior wall and the assembly 100 extends to an approximate distance of 1⅜" corresponding with a 1⅜" wall finish thickness, ⅞" corresponding with a ⅞" wall finish thickness, or ⅝" corresponding with a ⅝" wall finish thickness. The box assembly is then secured or mounted to the substrate through the use of one or more fasteners, typically screws, which are passed through the apertures 165 on the flange 145. Knockouts 225 are removed and electrical wire/cable is pulled and installed, as desired. Blackbutton® push-in connectors may also be installed in the knock-outs in order to secure the electrical wire/cable. Finally, any electrical connector, such as a duplex receptacle, is mounted on the box assembly to complete the box assembly installation process. A face plate (not shown) may also be installed, as required.

The reversible body, interchangeable box member, and optional extension spacer allow one box to work with the most commonly found exterior wall finishes. The invention alleviates the need to stock multiple boxes for multiple finishing thicknesses. The extra-wide flange 145 prevents water and air intrusion between the flange and stucco; no gaskets or caulking are required.

In a preferred embodiment, the electrical box assembly 100 is composed of a non-metallic thermoplastic material such as polypropylene, polyethylene, polyvinyl chloride, polycarbonate, or acrylonitrile butadiene styrene. The use of these materials assures that the device box assembly 100 possesses appropriate non-corrosive and non-conductive properties. This construction further assures that the assembly 100 is compatible with most building surfaces.

While the invention has been described in reference to certain preferred embodiments, it will be readily apparent to one of ordinary skill in the art that certain modifications or variations may be made to the system without departing from the scope of invention claimed below and described in the foregoing specification.

What is claimed is:

1. A reversible electrical box assembly configurable for use with various size reveals comprising:
    a flange member including a first side, a second side, and an opening therein;
    a first sidewall surrounding said opening and extending from said first side of said flange member to a first distance and terminating in a planar face;
    a second sidewall surrounding said opening and extending from said second side of said flange member to a second distance and terminating in a planar face, said second sidewall matching the size and profile of said first sidewall;
    a hollow spacer for optionally extending the length of said first or second sidewalls; said spacer including a peripheral wall matching the size and profile of said first and second sidewalls; said spacer having two planar faces;
    a mounting arrangement for mounting said spacer to said first sidewall or said second sidewall as needed for accommodating reveals;
    a fastening arrangement for securing an electrical component to said sidewalls or said spacer; and
    a box member for attachment to said first or second sidewalls to provide an electrical box enclosure on one side of said flange member, said box member including a peripheral wall and a back wall with said peripheral wall of said box member matching the size and profile of said first and second sidewalls; said box member having a planar face and an interior space defined by said peripheral wall and back wall.

2. The reversible electrical box assembly of claim 1 wherein said mounting arrangement for mounting said spacer to said first sidewall or said second sidewall includes
    a sidewall boss extending from said first and second sidewalls of said flange member, said sidewall boss including a bore therein;

a spacer boss extending from said peripheral wall of said spacer, said spacer boss including a bore therein;

said spacer adapted for alignment with said first sidewall and said second sidewall of said flange member in such a manner that said bore of said spacer boss is coaxial with said bore of said sidewall boss; and a fastener for insertion through said bore of said spacer boss into said bore of said sidewall boss.

3. The reversible electrical box assembly of claim 1 including an interior surface on said first and second sidewalls of said flange member and an interior surface on said peripheral wall of said spacer.

4. The reversible electrical box assembly of claim 3 wherein said fastening arrangement for securing an electrical component to said sidewalls or said spacer includes two component bosses extending from opposite sides of said interior surface of said first and second sidewalls of said flange member, said component bosses including bores therein;

two component bosses extending from opposing sides of said interior surface of said peripheral wall of said spacer; said components including bores therein;

said spacer adapted for alignment with said first sidewall and said second sidewall of said flange member in such a manner that said bores in said component bosses of said spacer are each coaxial with a corresponding bore of said component bosses of said first and second sidewalls; and a fastener for insertion through said bore of said component boss in said spacer into said bore of said component boss of said flange member.

5. The reversible electrical assembly of claim 4 wherein said box member includes at least one fastening aperture capable of receiving a fastener for removably securing said box member to said first sidewall or said second sidewall.

6. The reversible electrical assembly of claim 5 wherein said box member further includes at least one post projecting outward from said peripheral wall whereby said post assists in preventing travel of said box member when said box member is attached to said first sidewall or said second sidewall.

7. The reversible electrical assembly of claim 5 wherein said box member further includes at least one alignment tab projecting outward from said peripheral wall and positioned adjacent to said fastening aperture.

8. The reversible electrical assembly of claim 5 wherein said rear enclosure box member includes an aperture capable of receiving a fastener; said aperture leading to a semi-enclosed channel formed by the projection of a portion of said peripheral wall of said box member into the interior space of said box member, and a fastener disposed with said channel; no portion of said fastener extending beyond the plane of the back wall of said box member.

9. The reversible electrical assembly of claim 4 wherein said box member includes at least one mounting portion for removably securing said box member to said first sidewall or said second sidewall; said mounting portion comprising:

an aperture capable of receiving a fastener on said planar face of said box member;

a semi-enclosed channel formed by the projection of a portion of said peripheral wall of said box member into the interior space of said box member, whereby said channel is exterior to the interior space and capable of receiving said fastener.

10. The reversible electrical assembly of claim 4 wherein said box member for attachment includes at least one knockout portion located on said peripheral wall or back wall.

11. The reversible electrical assembly of claim 1 wherein said first and second sidewall are essentially rectangular in shape.

12. The reversible electrical assembly of claim 1 wherein said first and second sidewall have an annular shape.

13. The reversible electrical assembly of claim 1 wherein said flange further includes at least one aperture for mounting said electrical box assembly on a substrate.

14. The reversible electrical assembly of claim 13 wherein said flange member is of such a size and shape as to prevent water and air intrusion when mounted to said substrate.

15. The reversible electrical assembly of claim 13 wherein said opening is essentially centered in said flange member.

16. The reversible electrical assembly of claim 1 wherein said hollow spacer includes a flange extending outward from at least a portion of said peripheral wall on one side of said spacer.

17. A reversible electrical box assembly configurable for use with various size reveals comprising:

a flange member including a first side, a second side, and an essentially circular opening therein;

a first annular sidewall surrounding said opening and extending from said first side of said flange member to a first distance; said first sidewall terminating in a planar face;

a second annular sidewall surrounding said opening and extending from said second side of said flange member to a second distance, said second sidewall matching the size and profile of said first sidewall and terminating in a planar face;

an annular hollow spacer for optionally extending the length of said first or second sidewalls; said spacer including two planar faces and a peripheral wall matching the size and profile of said first and second sidewalls;

a mounting arrangement for mounting said spacer to said first sidewall or said second sidewall as needed for accommodating reveals;

a fastening arrangement for securing an electrical component to said sidewalls or said spacer; and a rear enclosure plate for attachment to said first or second sidewalls to provide an electrical box enclosure on one side of said flange member; said rear enclosure plate having at least one knockout portion therein.

18. The reversible electrical box assembly of claim 17 wherein said mounting arrangement for mounting said spacer to said first sidewall or said second sidewall includes a sidewall boss extending from said first and second sidewalls of said flange member, said sidewall boss including a bore therein;

a spacer boss extending from said peripheral wall of said spacer, said spacer boss including a bore therein;

said spacer adapted for alignment with said first sidewall and said second sidewall of said flange member in such a manner that said bore of said spacer boss is coaxial with said bore of said sidewall boss; and a fastener for insertion through said bore of said spacer boss into said bore of said sidewall boss.

19. The reversible electrical box assembly of claim 17 wherein said fastening arrangement for securing an electrical component to said sidewalls or said spacer includes two component bosses extending from opposite sides of said interior surface of said first and second sidewalls of said flange member, said component bosses including bores therein;

two component bosses extending from opposing sides of said interior surface of said peripheral wall of said spacer; said components including bores therein;

said spacer adapted for alignment with said first sidewall and said second sidewall of said flange member in such a manner that said bores in said component bosses of said spacer are each coaxial with a corresponding bore of said component bosses of said first and second sidewalls; and a fastener for insertion through said bore of said component boss in said spacer into said bore of said component boss of said flange member.

* * * * *